United States Patent [19]

Maucher

[11] 3,733,686
[45] May 22, 1973

[54] METHOD FOR WELDING TITANIUM CLAD STEEL

[75] Inventor: Lawrence Ambrose Maucher, Lancaster Village, Wilmington, Del.

[73] Assignee: E.I. du Pont de Nemours and Company, Wilmington, Del.

[22] Filed: Oct. 27, 1971

[21] Appl. No.: 192,931

[52] U.S. Cl. .................... 29/472.1, 29/481, 29/482, 29/483, 29/494
[51] Int. Cl. .............................................. B23k 31/02
[58] Field of Search .................... 29/471.1, 475, 480, 29/481, 482, 483, 494, 472.1, 490, 504, DIG. 48

[56] References Cited

UNITED STATES PATENTS

| | | | |
|---|---|---|---|
| 1,934,064 | 11/1933 | Hermanson et al. | 29/483 X |
| 2,158,799 | 5/1939 | Larson | 29/471.1 |
| 2,177,868 | 10/1934 | Chapman | 29/483 X |
| 2,209,290 | 7/1940 | Watts | 29/471.1 X |
| 2,943,387 | 7/1960 | Dawson | 29/471.1 |
| 3,474,344 | 10/1969 | Perl | 29/471.1 X |
| 3,629,932 | 12/1971 | Richter | 29/472.1 |

Primary Examiner—J. Spencer Overholser
Assistant Examiner—Richard Bernard Lazarus
Attorney—Theodore C. Gregory

[57] ABSTRACT

Titanium clad steel parts are welded together by removing the titanium clad from the steel for a sufficient distance to permit welding of the steel without contaminating the titanium, machining into the titanium clad, adjacent to surface from which the titanium clad was removed, a shelf, welding the steel portion with steel to form a steel joint uncovered by titanium the length of the steel weld, applying a titanium strip over said uncovered steel area but not touching the steel area, said titanium strip resting on the titanium shelves of the parts to be welded, and welding said titanium strip to said titanium clad at each side of said strip.

1 Claim, 5 Drawing Figures

PATENTED MAY 22 1973 3,733,686

INVENTOR

LAWRENCE AMBROSE MAUCHER

BY Theodore C. Gregory

ATTORNEY

METHOD FOR WELDING TITANIUM CLAD STEEL

BACKGROUND OF THE INVENTION

1. Field of the Invention

This invention relates to a method for welding titanium clad steel. More specifically, this invention relates to a method of welding titanium clad steel by welding the titanium and the steel without contacting each other.

2. Description of the Prior Art

Titanium steel plate, particularly that manufactured by the explosion bonding process, has become quite popular for the fabrication of chemical process equipment for use under highly corrosive conditions. To fabricate equipment, it is necessary to weld various parts or sections. This poses several problems because of the requirements for welding titanium. Welding of the steel segment of the titanium clad steel plate must be accomplished without contacting the steel with the titanium metal. Welding of the titanium segment must be accomplished without contacting the titanium with the steel. If such contact occurs, either the titanium metal cladding or the titanium weld is ruined. Such contact causes the weld to crack. Welding titanium also requires the use of one of the well-known inert gas welding methods, e.g., the heliarc welding process. In the past, welding of such clad steel plates has required removal of the titanium cladding from the area of the steel weld and, after the steel weld is complete, adding a titanium filler strip and then covering the entire area with a second, wider titanium strip which is then welded to the titanium clad. While seams can be welded by this procedure, it is time consuming, requires the extra titanium filler strip and can cause problems should leaks, particularly pinhole leaks occur. In any case an easier, less costly and more easily repaired system for welding titanium clad steel is needed.

It is an object of the present invention to provide a method of welding titanium clad steel. It is also an object to provide a method for welding titanium clad steel without contacting the titanium weld with the steel weld. It is also an object of the present invention to provide a method of welding titanium clad steel that does not require an extra titanium filler strip. It is also an object of this invention to provide a titanium clad steel weld that can be repaired more readily.

SUMMARY OF THE INVENTION

Now in accordance with the invention a method of welding titanium clad steel has been discovered which comprises:

a. cutting the steel portion of said sheets to form an angle with the vertical of approximately 30°, b. removing titanium clad from the sheet for a sufficient distance to permit steel welding, c. removing a portion of the titanium clad immediately adjacent to the area of (b) to form a shelf of titanium clad on each sheet to be welded, d. welding the steel portion of said sheets with steel to form a steel joint uncovered by titanium the length of the steel weld and having a titanium clad shelf adjacent each side of said steel weld, e. drilling and tapping a hole through the steel weld, f. applying a titanium strip that rests on said shelves sufficiently near the unmachined portions of the titanium clad to weld the titanium strip to the titanium clad and covering but not touching the steel portion from which titanium clad was removed, g. welding both sides and ends of said titanium strip to the titanium clad while an inert gas is supplied into the hole in the steel weld.

The invention can be best illustrated by referring to the drawings.

FIG. 1 of the drawings illustrates the prior art method of welding titanium clad steel.

Figure 1:
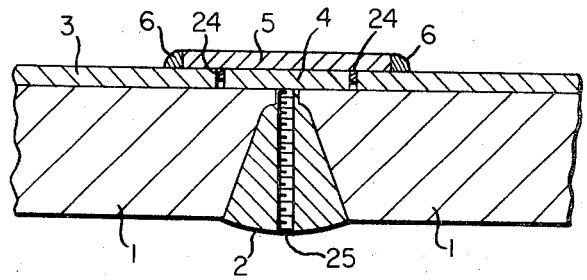

Referring now to FIG. 1 illustrating the art method for welding titanium clad steel, 1 is the steel portion of the sheet, 2 is the steel weld, 3 is the titanium clad portion of the sheet, 4 is the titanium filler strip, 5 is the titanium cover strip, 6 is the titanium weld, and 25 is a tapped hole through the steel weld which is threaded to accommodate a fitting for an inert gas (argon) purge used during titanium welding. In carrying out such welding operation, the titanium is first removed from the area of the steel weld by machining. Then the steel portion of the plate is welded. The filler strip 4 is then added. It is seal welded 24 to the titanium clad 3, joining the edges without touching steel 1. Cover strip 5 is then applied and welded at both sides 6. While such method can certainly be used to seal joints in process equipment and the like, it is more costly due to the necessity for filler strip 4. Also, should pinhole leaks occur in welds 6, they are very difficult to repair. Chemical material passing through such pinhole leaks, when the welding method is used for chemical process equipment, gets between titanium clad 3 and strips 4 and 5 and between strips 4 and 5 themselves. Heating the area of the pinhole leak to seal same by rewelding causes the chemical material to expand into the pinhole leak again. As is well known, titanium welding will not occur when foreign materials are present. Since it is very difficult to remove foreign materials from under strip 5, it is very difficult to effectively repair such pinhole leaks. The result is a very considerably loss in operating time for the process equipment. The present invention makes repair of pinhole leaks easy as is shown hereinbelow.

Figure 2:
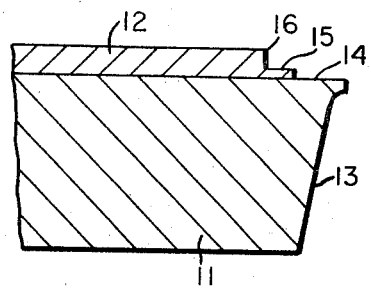
FIG. 2 illustrates a sheet of titanium clad steel prior to welding by the method of this invention.

Referring now to FIG. 2, 11 is the steel portion of the sheet, 12 is the titanium clad portion of the sheet, 13 is the prepared tapered edge which with the other tapered edge in the steel sheets for welding together form a trapezoidal section, 14 is the area of steel from which titanium must be removed, 15 is the shelf on the titanium clad, obtained by machining away a portion of clad 12 and 16 is the titanium surface joining shelf 15 and the original outersurface of clad 12. Surface 16 is shown as forming a 90° angle with shelf 15.

Referring now to FIG. 3, 11, 12, 13, 14, 15 and 16 have the same meanings as in FIG. 2, 17 is the titanium cover strip, 18 are the completed titanium welds and 19 is the open space between strip 17 and the open steel areas 14, 20 is the steel weld, and 26 is a tapped and threaded hole providing access to and from space 19 through steel weld 20.

Strip 17 is shown as having tapered edges that taper to form a 30° angle with edge 16. This angle however is not critical and may vary. The width of strip 17 at the surface which contacts shelves 15 should be wide enough to overlap shelves 15 but not so wide that the edge of 17 contacts surfaces 16.

In forming the weld 18, filler wire may or may not be used for the first weld pass. The gap is filled with titanium filler metal.

Figure 3:
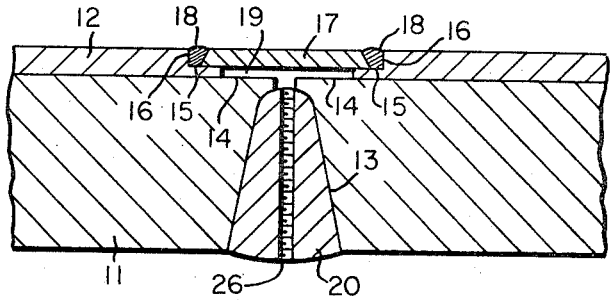
FIG. 3 illustrates a welded titanium clad joint according to the present invention.

In carrying out the welds shown in FIG. 3 those skilled in the welding art will realize that steel weld 20 can be carried out by any of the many means available for welding steel while the titanium welds 18 require inert gas shielded arc welding.

The open space 19 serves two purposes. It provides a passage for inert gas called backup gas that is required for titanium welding. The tapped hole 26 into the open space 19 serves as inlet for the inert gas purge during the welding operation, and provides a test hole and is left open to show if leaking occurs from the inside.

As noted earlier, chemicals tend to pass through pinholes that may develop in the course of use of the equipment formed from the titanium clad steel. The prior system requires removal of the cover strip, illustrated in FIG. 1 as 5, to perform repairs due to the contamination in any pinholes that develop. Using the method of the present invention welds can be repaired by grinding out or drilling the pinhole section, flushing out contaminants through the open space 19 then re-welding the groundout section. Thus, one a pinhole leak in a piece of process equipment is located, the leak is very quickly repaired so that the equipment can be returned to service with a minimum loss of time.

Figure 4A:
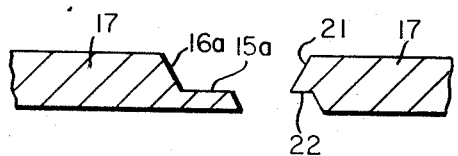
FIGS. 4a and 4b illustrate a method for welding and joining extensions of a titanium filler strip.
Figure 4B:
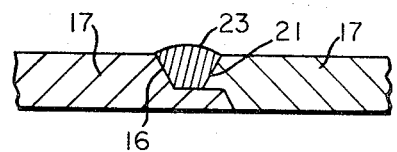

FIG. 4(a) and 4(b) illustrate a suitable method for joining and welding sections of cover strip 17, where this is necessary. It will be realized by those skilled in the art that in the fabrication of chemical process equipment and the like from titanium clad steel, the titanium clad will be inside the vessel. Because of space limitations and the like, it is usually not possible to form a welded joint as illustrated in FIG. 3 within a vessel with a single cover strip 17. The cover strip may be one or more pieces welded together as illustrated in FIG. 4(a) and 4(b).

Referring now to FIG. 4(a), two pieces of strip 17 wherein shelf 15a is cut out to receive surface 22 with surface 21 having approximately the same angle as surface 16a. Undercut 22 is sufficiently deep to overlay shelf 15a to form a smooth surface on the underside of 17. Undercut 22 is restricted in the longitudinal direction so that the edge of surface 21 does not contact surface 16a.

Referring now to FIG. 4(b), 23 represents the titanium weld of strip 17 after assembly as indicated in FIG. 4(a).

It will be realized by those skilled in the welding art that the thickness and width of shelf 15 can vary widely depending on the thickness of the titanium clad 12. In a typical instance where the titanium clad has a thickness of three-sixteenths inch, shelf 15 would be approximately one-sixteenth inch thick and three-sixteenths inch wide. These dimensions are in no manner critical, however, and may vary widely.

The foregoing detailed description has been given for clarity of understanding only and no unnecessary limitations are to be understood therefrom. The invention is not limited to exact details shown and described for obvious modifications will occur to one skilled in the art.

What is claimed is:

1. The process of welding titanium clad steel sheets which comprises:
   a. cutting the steel portion of said sheets to form an angle with the vertical of approximately 30°,
   b. removing titanium clad from the sheet for a sufficient distance to permit steel welding,
   c. removing a portion of the titanium clad immediately adjacent to the area of (b) to form a shelf of titanium clad on each sheet to be welded,
   d. welding the steel portion of said sheets with steel to form a steel joint uncovered by titanium the length of the steel weld and having a titanium clad shelf adjacent each side of said steel weld,
   e. drilling and tapping a hole through the steel weld,
   f. applying a titanium strip that rests on said shelves sufficiently near the unmachined portions of the titanium clad to weld the titanium strip to the titanium clad and covering but not touching the steel portion from which titanium clad was removed,
   g. welding both sides and ends of said titanium strip to the titanium clad while an inert gas is supplied into the hole in the steel weld.

* * * * *